(12) United States Patent
Zhou et al.

(10) Patent No.: US 11,137,656 B1
(45) Date of Patent: Oct. 5, 2021

(54) FLEXIBLE BISTABLE LIGHT MODULATING DEVICE

(71) Applicant: Smart Liquid Crystal Technologies Co., Ltd., Suzhou (CN)

(72) Inventors: Mengchao Zhou, Suzhou (CN); Fei Wang, Suzhou (CN); Hongwei Zhang, Suzhou (CN); Hui Xu, Suzhou (CN); Dong Li, Suzhou (CN)

(73) Assignee: Smart Liquid Crystal Technologies Co., Ltd., Suzhou (CN)

( * ) Notice: Subject to any disclaimer, the term of this patent is extended or adjusted under 35 U.S.C. 154(b) by 0 days.

(21) Appl. No.: 17/272,509

(22) PCT Filed: Sep. 11, 2019

(86) PCT No.: PCT/CN2019/105340
§ 371 (c)(1),
(2) Date: Mar. 1, 2021

(87) PCT Pub. No.: WO2020/052585
PCT Pub. Date: Mar. 19, 2020

(30) Foreign Application Priority Data

Sep. 13, 2018 (CN) .......................... 201811069518.5

(51) Int. Cl.
*G02F 1/137* (2006.01)
*G02F 1/1333* (2006.01)
(Continued)

(52) U.S. Cl.
CPC ...... *G02F 1/13756* (2021.01); *C09K 19/3003* (2013.01); *C09K 19/586* (2013.01);
(Continued)

(58) Field of Classification Search
None
See application file for complete search history.

(56) References Cited

U.S. PATENT DOCUMENTS 5,784,141 A    7/1998   Chen et al.
6,061,107 A *   5/2000   Yang .................. G02F 1/13718
                                                  349/156
(Continued)

FOREIGN PATENT DOCUMENTS

CN        1237754 A     12/1999
CN    101261383 A      9/2008
(Continued)

OTHER PUBLICATIONS

Notification of First Office Action, Chinese Patent Application No. 201811069518, dated Aug. 17, 2020, 19 pages.
(Continued)

*Primary Examiner* — James A Dudek
(74) *Attorney, Agent, or Firm* — Hoffmann & Baron, LLP

(57) ABSTRACT

A flexible bistable light modulating device includes a first flexible transparent conductive film and a second flexible transparent conductive film; and a liquid crystal layer disposed between the first flexible transparent conductive film and the second flexible transparent conductive film. The liquid crystal layer includes a liquid crystal mixture and a sealing structure to seal the liquid crystal mixture within the liquid crystal layer. The liquid crystal mixture includes at least one bimesogenic compound, at least one nematic liquid crystal compound and at least one chiral compound; and a plurality of supporting structures dispersing inside the liquid crystal layer. The weight percentage of the supporting structures over the liquid crystal mixture is 0.1%-4.5%. The flexible bistable light modulating device has two states that are stable without application of an external electric field, thus saving energy, simplifying the production process, saving cost and improving product yield.

12 Claims, 2 Drawing Sheets

(51) Int. Cl.
*G02F 1/1339* (2006.01)
*G02F 1/139* (2006.01)
*G02F 1/1343* (2006.01)
*C09K 19/30* (2006.01)
*C09K 19/58* (2006.01)

(52) U.S. Cl.
CPC ........ *G02F 1/1391* (2013.01); *G02F 1/13392* (2013.01); *G02F 1/13439* (2013.01); *G02F 1/133305* (2013.01); *G02F 1/134309* (2013.01); *C09K 2019/3016* (2013.01); *G02F 2203/03* (2013.01)

(56) References Cited

U.S. PATENT DOCUMENTS

| | | |
|---|---|---|
| 2005/0041197 A1 | 2/2005 | Ionescu |
| 2008/0049175 A1 | 2/2008 | Komitov et al. |
| 2010/0296038 A1 | 11/2010 | Farrand et al. |
| 2021/0198575 A1* | 7/2021 | Zhang ................ G02F 1/137 |

FOREIGN PATENT DOCUMENTS

| | | |
|---|---|---|
| CN | 203037966 U | 7/2013 |
| CN | 204855991 U | 12/2015 |
| CN | 106405916 A | 2/2017 |
| CN | 106918940 A | 7/2017 |
| CN | 107075370 A | 8/2017 |
| CN | 107209422 A | 9/2017 |
| CN | 107209426 A | 9/2017 |
| CN | 108303816 A | 7/2018 |
| CN | 201765412 U | 7/2018 |
| CN | 109825309 A | 5/2019 |
| CN | 110208990 A | 9/2019 |
| EP | 2 556 934 B1 | 12/2016 |
| WO | 2016/070952 A1 | 5/2016 |
| WO | 2017/001043 A1 | 1/2017 |
| WO | 2019/101060 A1 | 5/2019 |

OTHER PUBLICATIONS

Decision to Grant, Chinese Patent Application No. 201811069518, dated Dec. 1, 2020, 12 pages.

Gwag, Jin Seog et al.,Electro-Optic Characteristics in a Cholesteric Phase of Bimesogenic Liquid Crystals, Mol. Cryst. Liq. Cryst., vol. 511, 8 pages, 2009.

* cited by examiner (a) (b)

FLEXIBLE BISTABLE LIGHT MODULATING DEVICE

CROSS-REFERENCE TO RELATED APPLICATIONS

This application is the National Stage of International Application No. PCT/CN2019/105340, filed Sep. 11, 2019, which claims the benefit of Chinese Application No. 201811069518.5, filed Sep. 13, 2018, the contents of which is incorporated by reference herein.

TECHNICAL FIELD

The present invention relates to the liquid crystal display field, and more particularly, to a flexible and liquid-crystal-based bistable light modulating device.

BACKGROUND OF THE INVENTION

As a device exploiting the electro-optic effect, the liquid-crystal-based light modulating device is mainly comprised of transparent conductive substrates and liquid crystal materials, where the orientation of liquid crystal molecules may be manipulated by applying an external electric field to switch between different optical states. Because of their unique characteristics, liquid-crystal-based light modulating devices are used in a wide range of applications, such as building materials, home decoration devices, automotive displays, and consuming electronic devices etc., for the realization of privacy, beautification and energy-saving functions.

Most liquid-crystal-based light modulating devices use transparent sheet glass coated with transparent conductive materials as substrates, and the manufacturing of which involves expensive and time consuming vacuum processes. Due to the rigidity of the glass substrates, the application of such light modulating devices may be further limited. On the other hand, flexible light modulating devices solve these problems and therefore could potentially expand the areas of applications. At present, the more mature flexible light modulating technology is polymer dispersed liquid crystal (PDLC) technology, as disclosed in patent CN106918940A, which achieves the switching between a transparent state and an opaque state via application of an external electric field. However the preparation of PDLC needs to introduce polymers to provide a polymer network structure for stabilization of liquid crystals. Moreover, the performance of PDLC devices strongly depends on phase compositions, morphologies, sizes, phase interface properties and the matching of the liquid crystal phase and the polymer phase, which are controlled by the production process. To achieve a good performance, the preparation method and process conditions need to be strictly controlled, which increases the complexity and difficulty of production, increases cost, and further limits the application of the light modulating devices. At the same time, PDLC devices have low light transmittance in the transparent state and further appear hazy, particularly in off axis directions, which degrade their optical quality. Additionally, the transparent state requires constant application of electric field therefore continuous consumption of energy, further limiting their application.

Therefore, there remains a need for a flexible light modulating device which has high light transmission and bistable states, and further the complexity and difficulty of the production process is reduced, thus saving cost and improving yield.

SUMMARY OF THE INVENTION

In order to overcome the above mentioned issues, one objective of the present invention is to provide a bistable light modulating device which comprises a first flexible transparent conductive film and a second flexible transparent conductive film; a liquid crystal layer disposed between the first flexible transparent conductive film and the second flexible transparent conductive film, where the liquid crystal layer includes a liquid crystal mixture and a sealing structure to seal the liquid crystal mixture within the liquid crystal layer, and the liquid crystal mixture includes at least one bimesogenic compound, at least one nematic liquid crystal compound and at least one chiral compound; and a plurality of supporting structures distributed inside the liquid crystal layer, wherein the weight percentage of the supporting structures over the liquid crystal mixture is 0.1%-4.5%. The bistable light modulating device includes two states that are stable when no external electric field is applied: a transparent state where substantially all incident light is transmitted and a light scattering state where substantially all incident light is scattered. In a preferred embodiment, the thickness of the liquid crystal layer is 5-60 μm.

In some embodiments, the first flexible transparent conductive film comprises a first flexible transparent substrate and a first flexible transparent electrode sandwiched between the first flexible transparent substrate and the liquid crystal layer, and the second flexible transparent conductive film includes a second flexible transparent substrate and a second flexible transparent electrode sandwiched between the second flexible transparent substrate and the liquid crystal layer. In a preferred embodiment, the materials of the first flexible transparent substrate and the second flexible transparent substrate include PET, PEN, PC, PP, PMMA, PBT, PVC, PI and/or cellulose. In another preferred embodiment, the first flexible transparent electrode or the second flexible transparent electrode is a carbon-based conductive film, a metallic nanowire conductive film and/or a metallic oxide conductive film.

In some embodiments, the bistable light modulating device comprises at least one alignment layer disposed between the first flexible transparent conductive film and the liquid crystal layer and/or between the second flexible transparent conductive film and the liquid crystal layer.

In a preferred embodiment, the sealing structure is formed from a sealant which includes thermo-curable adhesive, photo-curable adhesive and/or UV-thermo-curable adhesive.

In a preferred embodiment, the material of the supporting structures includes resins, fiber glass and/or inorganic materials. In another preferred embodiment, the supporting structures are sphere-shaped, rod-shaped or their combination. In another preferred embodiment, the supporting structures have a hard core and a sticky surface, wherein the supporting structures are immiscible with the liquid crystal mixture.

In some embodiments, the bistable light modulating device comprises a plurality of individual bonding structures disposed in the liquid crystal layer, wherein the bonding structures connect to the inner surfaces of the first flexible transparent conductive film and the second flexible transparent conductive. In a preferred embodiment, the bonding structures are arranged in a predetermined pattern, wherein the predetermined which is a two dimensional hexagonal, square or pseudo random pattern.

In the present invention, by introducing bimesogenic compounds into the liquid crystal layer, the flexible bistable light modulating device can realize zero-electric-field bistable states without the assist of the polymer network, thus saving energy, simplifying the production process, saving cost and improving product yield.

BRIEF DESCRIPTION OF THE DRAWINGS

These and other features and advantages of the present invention will be better understood by reference to the following detailed description of an illustrative embodiment of the present disclosure when read in conjunction with the accompanying drawings, wherein.

DETAILED DESCRIPTION OF THE INVENTION

The following description of the disclosed embodiments is provided in detail to enable any person skilled in the art to fully understand the present invention. However, it will be apparent to those skilled in the art to readily make or use the present invention without these specific details. In other examples, well-known structures and devices are shown in the block diagram. In this regard, the description of the different illustrative exemplary embodiments presented herein are for the purpose of illustration and description and are not intended to be exhaustive or limited to the inventive concept. Accordingly, the scope of the invention is not to be limited by the specific embodiments described above, and is subject only to the scope of the appended claims.

Figure 1:
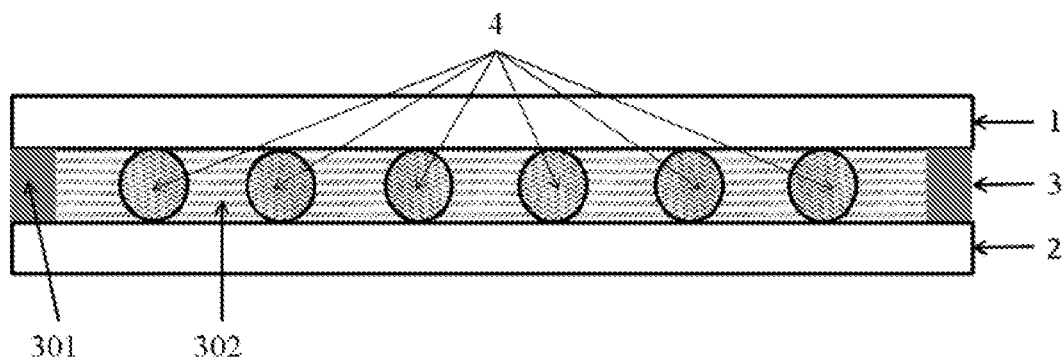
FIG. 1 is a schematic, illustrative view of the structure of the light modulating device according to one embodiment.

The present invention discloses a flexible bistable light modulating device with two stable states: a transparent state where substantially all incident light is transmitted and a light scattering state where substantially all incident light is scattered. As shown in FIG. 1, the bistable light modulating device includes a first flexible transparent conductive film 1, a second flexible transparent conductive film 2, a liquid crystal layer 3 sandwiched between the first flexible transparent conductive film 1 and the second flexible transparent conductive film 2 and a plurality of supporting structures 4 distributed in the liquid crystal layer 3.

Figure 2:
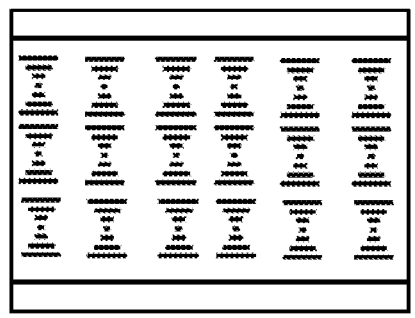
FIG. 2 is a schematic, illustrative view of the two stable states of the bistable light modulating device.
Figure 2:
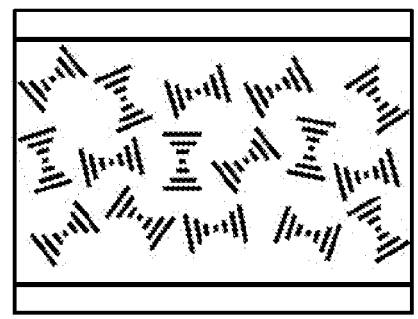

The liquid crystal layer 3 further contains a sealing structure 301 and a liquid crystal mixture 302 sealed within the liquid crystal layer 3 by the sealing structure 301. The liquid crystal mixture 302 comprises at least one bimesogenic compound, at least one nematic liquid crystal compound and at least one chiral compound, wherein the bimesogenic compound is a liquid crystal compound containing two mesogen groups, that is, two groups capable of inducing a liquid crystal phase. The nematic liquid crystal compound in the present invention does not include bimesogenic compounds. The liquid crystal mixture in the role of a chiral compound can form a cholesteric liquid crystal, providing the light modulating device two stable states: the transparent state (a) where substantially all incident light goes though the device and the light scattering state (b) where substantially all incident light is scattered (as shown in FIG. 2). In the transparent state (a), the cholesteric liquid crystal molecules are substantially aligned parallel to the device substrate, and the helical axis thereof is perpendicular to the device substrate to form a planar texture, where the incident light transmits through the light modulating device substantially unaffected. While in the scattering state (b), the cholesteric liquid crystal molecules form a focal conic texture and the incident light is substantially scattered to form a state in which the haze is large but total light transmittance contains in a certain level. In addition, the transparent state and the light scattering state do not require an external electric field to maintain the stable states. By selecting a suitable driving method, the light modulating device can be switched between the transparent state and the light scattering state, thereby achieving the purpose of light modulating.

The sealing structure 301 is used to bond the two flexible transparent conductive films together with a certain gap while to seal the liquid crystal mixture between the two flexible transparent conductive films. The sealing structure may be formed by polymerization of a sealant. The sealant may be a thermal-curable adhesive such as a commonly used epoxy resin, a photo-curable adhesive such as a commonly used UV adhesive, or a UV-thermal-curable adhesive. In the following examples, the sealant is a UV adhesive 350 produced by Hong Kong Yihui Group.

The supporting structures 4 touch the inner surfaces of the two flexible transparent conductive films to adjust and control the gap between them, and moreover provide a supporting force and uniformity for the flexible light modulating device, thereby improving the toughness of the flexible light modulating device. The concentration of the supporting structures 4 is critical. If the concentration is too low, the supporting structures cannot provide sufficient support force, which may easily cause the surface of the flexible light modulating device uneven or concave; if the concentration is too high, the light transmittance and haze of the light modulating device may be affected, further affecting the final performance of the flexible light modulating device. In the embodiments of the present invention, the weight percentage of the supporting structures 4 over the liquid crystal mixture is between about 0.1% and 4.5%, which ensures that the haze of the flexible light modulating device in the transparent state meets the requirements (the haze of a general light modulating glass in the transparent state is 6%) and the total light transmittance in the light scattering state can still be greater than 50%. The supporting structures 4, located anywhere in the liquid crystal layer 3 and even inside the sealing structure 301, are made of resins, fiber glass and/or inorganic materials, such as polystyrene, silicon dioxide, silicon, etc. The supporting structures 4 are sphere-shaped, rod-shaped or their combination. The supporting structures 4 may also have a hard core and a sticky surface which further provides a more stable support force for improving the uniformity of a bent light modulating device. The material of the supporting structures should be immiscible with the liquid crystal mixture. The thickness of the liquid crystal layer, controlled by the size of the support structures 4, is about 5 to 60 microns.

Figure 3:
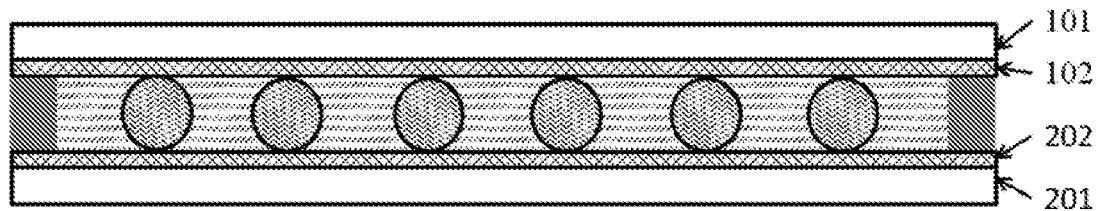
FIG. 3 is a schematic, illustrative view of the structure of the light modulating device according to another embodiment.

The two flexible transparent conductive films further respectively comprise a flexible transparent substrate (101 or 201) and a flexible transparent electrode (102 or 202) disposed between the flexible transparent substrate and the liquid crystal layer, as shown in FIG. 3. The flexible transparent substrate is made of transparent polymer materials such as PET, PEN, PC, PP, PMMA, PBT, PVC, PI, cellulose, etc. The invention is not limited to this, and other flexible materials with light transmission conforming to the requirements may also be used. The flexible transparent electrode may cover the entire inner surface of the flexible transparent substrate, as shown in FIG. 3, be etched to a specific shape as necessary, or be spitted into multiple electrodes. Depending on its materials, the flexible transparent electrodes may be classified into carbon-based conductive films, metallic nanowire conductive films, and metallic oxide conductive films. The materials of the carbon-based conductive films mainly include graphene oxide and carbon nanotubes. The carbon-based conductive films may be prepared by a hybrid method. The metallic nanowire conductive films usually use silver nanowires or copper nanowires. The main materials of the metallic oxide conductive film are indium tin oxide (ITO), indium oxide, tin oxide, zinc oxide, and a mixed system of other metallic oxides.

Figure 4:
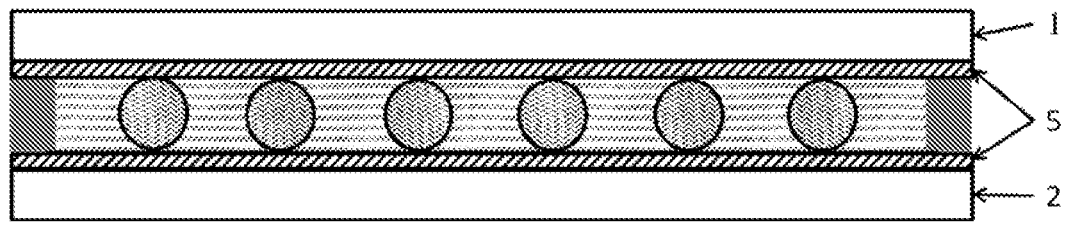
FIG. 4 is a schematic, illustrative view of the structure of the light modulating device according to another embodiment.

As shown in FIG. 4, the bistable light modulating device may also include at least one alignment layer 5, which further provides a specific orientation arrangement for the liquid crystal molecules in the liquid crystal layer 3. The bistable light modulating device may have two alignment layers locating on the inner surfaces of two flexible transparent conductive films 1 and 2 (i.e. the surfaces contacting to the liquid crystal layer), as shown in FIG. 4. Moreover, the bistable light modulating device may have only one alignment layer 5 disposed on the inner surface of either of the flexible transparent conductive films. The alignment layer 5 is generally formed through the curing of an orientation agent, where the orientation agent is generally an organic polymer material such as PVB, siloxane and polyimide materials. Depending on the pretilt angle (i.e. the angle between the long axis of the liquid crystal molecules and the surface of the alignment layer when the liquid crystal molecules are sequentially arranged on the surface of the alignment layer), the alignment layer can be classified into homogenous alignment where the long axis is substantially parallel to the surface, such as IPS, TN or STN type, or heterogeneous alignment where the long axis is substantially vertical to the surface, such as VA type.

Figure 5:
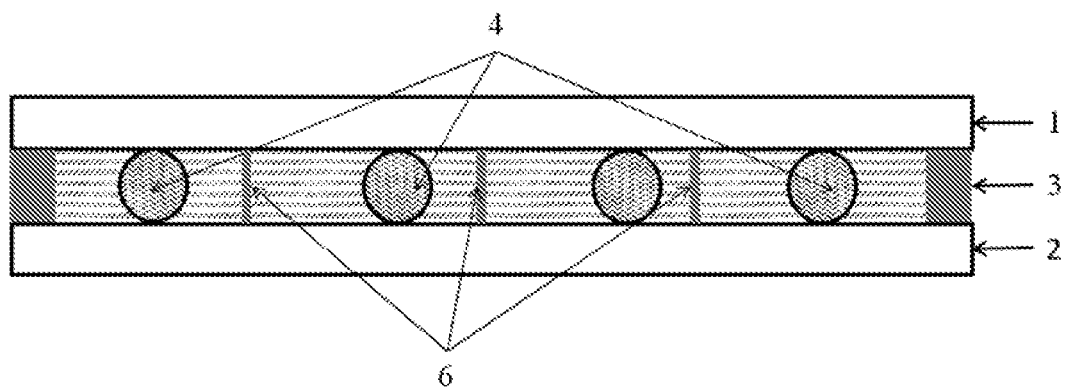
FIG. 5 is a schematic, illustrative view of the structure of the light modulating device according to another embodiment.

In some embodiment, the bistable light modulating device further comprises a plurality of individual bonding structures 6 distributed in the liquid crystal layer 3, as shown in FIG. 5. The bonding structures 6 connect to the inner surfaces of the two flexible transparent conductive films. The bonding structures may be independent to each other or arranged in a predetermined pattern. The predetermined pattern may be a two dimensional hexagonal, square or pseudo random pattern. In the predetermined lattice, the diameter of the bonding structures is about 0.01-1 mm and the distance between adjacent structures is about 0.02-20 mm. The materials of the bonding structures may be same as that of the sealing structure, or other materials. The bonding structures can provide additional bonding power and supporting power between the two flexible transparent conductive films and effectively prevent the flowing of the liquid crystal mixture, thus stabilizing the performance of the bistable light modulating device during bend.

In the following examples, the structure and optical performance of the flexible bistable light modulating device will be described in detail. The total light transmittance and haze of the device in the transparent state and in the light scattering state are measured using a WGT-S type haze meter.

In the following examples, the formula of the liquid crystal mixture is list in TABLE 1-3.

TABLE 1

| formula 1 of the liquid crystal mixture | | |
|---|---|---|
| | Component | wt % |
| Nematic liquid crystal compound | 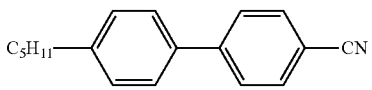 | 13.5 |
| | 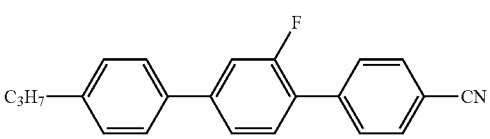 | 10.6 |
| | 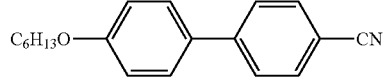 | 5.1 |
| | 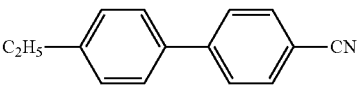 [SMILES: CCc1ccc(-c2ccc(C#N)cc2)cc1] | 5.1 |
| | 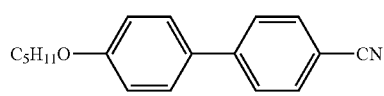 | 10.9 |
| | 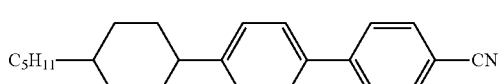 | 5.9 |

TABLE 1-continued formula 1 of the liquid crystal mixture

| | Component | wt % |
|---|---|---|
| | $C_5H_{11}$—⟨ph⟩—⟨ph⟩—⟨ph⟩—CN | 2.9 |
| Bimesogenic compound | NC—⟨ph⟩—⟨ph⟩—$(CH_2)_7$—⟨ph⟩—⟨ph⟩—CN | 15.0 |
| | NC—⟨ph⟩—⟨ph⟩—$(CH_2)_9$—⟨ph⟩—⟨ph⟩—CN | 15.0 |
| Chiral compound | (2-methylbutyl)—⟨ph⟩—⟨ph⟩—CN | 16.0 |

TABLE 2 formula 2 of the liquid crystal mixture

| | Component | wt % |
|---|---|---|
| Nematic liquid crystal compound | $C_5H_{11}$—⟨ph⟩—⟨ph⟩—CN | 13.5 |
| | $C_3H_7$—⟨ph⟩—⟨ph(F)⟩—⟨ph⟩—CN | 10.6 |
| | $C_6H_{13}O$—⟨ph⟩—⟨ph⟩—CN | 5.1 |
| | $C_2H_5$—⟨ph⟩—⟨ph⟩—CN | 5.1 |
| | $C_5H_{11}O$—⟨ph⟩—⟨ph⟩—CN | 10.9 |
| | $C_5H_{11}$—⟨cyclohexyl⟩—⟨ph⟩—⟨ph⟩—CN | 5.9 |
| | $C_5H_{11}$—⟨ph⟩—⟨ph⟩—⟨ph⟩—CN | 2.9 |
| Bimesogenic compound | NC—⟨ph⟩—⟨ph⟩—$(CH_2)_7$—⟨ph⟩—⟨ph⟩—CN | 30.0 |

TABLE 2-continued formula 2 of the liquid crystal mixture

| Component | | wt % |
|---|---|---|
| Chiral compound | (structure: 2-methylbutyl-biphenyl-CN) | 16.0 |

TABLE 3 formula 3 of the liquid crystal mixture

| | Component | wt % |
|---|---|---|
| Nematic liquid crystal compound | $C_5H_{11}$—⌬—⌬—CN | 15.5 |
| | $C_3H_7$—⌬—⌬(F)—⌬—CN | 12.2 |
| | $C_6H_{13}O$—⌬—⌬—CN | 5.9 |
| | $C_2H_5$—⌬—⌬—CN | 5.9 |
| | $C_5H_{11}O$—⌬—⌬—CN | 12.5 |
| | $C_5H_{11}$—(cyclohexyl)—⌬—⌬—CN | 6.7 |
| | $C_5H_{11}$—⌬—⌬—⌬—CN | 3.3 |
| Bimesogenic compound | NC—⌬—⌬—$(CH_2)_7$—⌬—⌬—CN | 10.0 |
| | NC—⌬—⌬—$(CH_2)_9$—⌬—⌬—CN | 10.0 |
| | NC—⌬—⌬—$(CH_2)_{11}$—⌬—⌬—CN | 10.0 |
| Chiral compound | (2-methylbutyl-biphenyl-CN) | 8.0 |

Example 1

In this example, the flexible bistable light modulating devices include two flexible transparent conductive films, a liquid crystal layer and supporting structures. The flexible transparent conductive films are PET/ITO films which are orientation through a rubbing alignment method. The formula of the liquid crystal mixture is shown in TABLE 1. The thickness of the liquid crystal layer is 15 microns. The supporting structures are spherical polystyrene spacers, which account for 0.2% of the total weigh of liquid crystal mixture. By selecting the appropriate driving voltage, the flexible bistable light modulating device was respectively driven to the transparent state or the light scattering state, where the total light transmittance and haze values are measured, as shown in TABLE 4.

TABLE 4

| performance data of the light modulating device | | | |
| --- | --- | --- | --- |
| Transparent state | | Light transmittance state | |
| Total light transmittance/% | Haze/% | Total light transmittance/% | Haze/% |
| 85.74 | 2.53 | 65.07 | 87.18 |

Example 2

In this example, the flexible bistable light modulating devices include two flexible transparent conductive films, one alignment layer, a liquid crystal layer and supporting structures. The flexible transparent conductive films are PET/ITO films and the alignment layer is VA type which is orientation through a rubbing alignment method. The formula of the liquid crystal mixture is shown in TABLE 1. The thickness of the liquid crystal layer is 15 microns. The supporting structures are spherical polystyrene spacers, which account for 0.2% of the total weigh of liquid crystal mixture. By selecting the appropriate driving voltage, the flexible bistable light modulating device was respectively driven to the transparent state or the light scattering state, where the total light transmittance and haze values are measured, as shown in TABLE 5.

TABLE 5

| performance data of the light modulating device | | | |
| --- | --- | --- | --- |
| Transparent state | | Light transmittance state | |
| Total light transmittance/% | Haze/% | Total light transmittance/% | Haze/% |
| 86.40 | 2.50 | 64.30 | 87.53 |

Example 3

In this example, the flexible bistable light modulating devices include two flexible transparent conductive films, two alignment layer, a liquid crystal layer and supporting structures. The flexible transparent conductive films are PET/ITO films and the alignment layers are VA type which is orientation through a rubbing alignment method. The formula of the liquid crystal mixture is shown in TABLE 1. The thickness of the liquid crystal layer is 50 microns. The supporting structures are spherical polystyrene spacers, which account for 0.2% of the total weigh of liquid crystal mixture. By selecting the appropriate driving voltage, the flexible bistable light modulating device was respectively driven to the transparent state or the light scattering state, where the total light transmittance and haze values are measured, as shown in TABLE 6.

TABLE 6

| performance data of the light modulating device | | | |
| --- | --- | --- | --- |
| Transparent state | | Light transmittance state | |
| Total light transmittance/% | Haze/% | Total light transmittance/% | Haze/% |
| 84.00 | 4.18 | 51.20 | 93.46 |

Example 5

In this example, the flexible bistable light modulating devices include two flexible transparent conductive films, two alignment layers, a liquid crystal layer and supporting structures. The flexible transparent conductive films are PET/ITO films and the alignment layers are VA type which is orientation through a rubbing alignment method. The formula of the liquid crystal mixture is shown in TABLE 1. The thickness of the liquid crystal layer is 15 microns. The supporting structures are spherical polystyrene spacers, which account for 2.0% of the total weigh of liquid crystal mixture. By selecting the appropriate driving voltage, the flexible bistable light modulating device was respectively driven to the transparent state or the light scattering state, where the total light transmittance and haze values are measured, as shown in TABLE 8.

TABLE 8

| performance data of the light modulating device | | | |
| --- | --- | --- | --- |
| Transparent state | | Light transmittance state | |
| Total light transmittance/% | Haze/% | Total light transmittance/% | Haze/% |
| 86.80 | 4.58 | 65.70 | 87.04 |

Example 6

In this example, the flexible bistable light modulating devices include two flexible transparent conductive films, two alignment layers, a liquid crystal layer and supporting structures. The flexible transparent conductive films are PET/ITO films and the alignment layers are VA type which is orientation through a rubbing alignment method. The formula of the liquid crystal mixture is shown in TABLE 1. The thickness of the liquid crystal layer is 10 microns. The supporting structures are spherical silicon spacers, which account for 0.2% of the total weight of the liquid crystal mixture. By selecting the appropriate driving voltage, the flexible bistable light modulating device was respectively driven to the transparent state or the light scattering state, where the total light transmittance and haze values are measured, as shown in TABLE 9.

TABLE 9 performance data of the light modulating device

| Transparent state | | Light transmittance state | |
|---|---|---|---|
| Total light transmittance/% | Haze/% | Total light transmittance/% | Haze/% |
| 86.70 | 2.17 | 67.70 | 83.49 |

Example 7

In this example, the flexible bistable light modulating devices include two flexible transparent conductive films, two alignment layers, a liquid crystal layer and supporting structures. The flexible transparent conductive films are PET/ITO films and the alignment layers are VA type which is orientation through a rubbing alignment method. The formula of the liquid crystal mixture is shown in TABLE 2. The thickness of the liquid crystal layer is 15 microns. The supporting structures are viscous spherical silicon dioxide spacers, which account for 0.2% of the total weight of the liquid crystal mixture. By selecting the appropriate driving voltage, the flexible bistable light modulating device was respectively driven to the transparent state or the light scattering state, where the total light transmittance and haze values are measured, as shown in TABLE 10.

TABLE 10 performance data of the light modulating device

| Transparent state | | Light transmittance state | |
|---|---|---|---|
| Total light transmittance/% | Haze/% | Total light transmittance/% | Haze/% |
| 86.16 | 2.75 | 64.68 | 87.29 |

Example 8

In this example, the flexible bistable light modulating devices include two flexible transparent conductive films, two alignment layers, a liquid crystal layer and supporting structures. The flexible transparent conductive films are PET/ITO films and the alignment layers are IPS type which is orientation through a rubbing alignment method. The formula of the liquid crystal mixture is shown in TABLE 1. The thickness of the liquid crystal layer is 20 microns. The supporting structures are spherical polystyrene spacers, which account for 0.1% of the total weight of the liquid crystal mixture. By selecting the appropriate driving voltage, the flexible bistable light modulating device was respectively driven to the transparent state or the light scattering state, where the total light transmittance and haze values are measured, as shown in TABLE 11.

TABLE 11 performance data of the light modulating device

| Transparent state | | Light transmittance state | |
|---|---|---|---|
| Total light transmittance/% | Haze/% | Total light transmittance/% | Haze/% |
| 87.60 | 1.57 | 64.40 | 90.45 |

Example 9

In this example, the flexible bistable light modulating devices include two flexible transparent conductive films, two alignment layers, a liquid crystal layer and supporting structures. The flexible transparent conductive films are PET/ITO films and the alignment layers are VA type which is orientation through a rubbing alignment method. The formula of the liquid crystal mixture is shown in TABLE 3. The thickness of the liquid crystal layer is 15 microns. The supporting structures are spherical polystyrene spacers, which account for 4.0% of the total weight of the liquid crystal mixture. By selecting the appropriate driving voltage, the flexible bistable light modulating device was respectively driven to the transparent state or the light scattering state, where the total light transmittance and haze values are measured, as shown in TABLE 12.

TABLE 12 performance data of the light modulating device

| Transparent state | | Light transmittance state | |
|---|---|---|---|
| Total light transmittance/% | Haze/% | Total light transmittance/% | Haze/% |
| 86.70 | 5.93 | 76.90 | 86.67 |

Example 10

In this example, the flexible bistable light modulating devices include two flexible transparent conductive films, two alignment layers, a liquid crystal layer and supporting structures. The flexible transparent conductive films are PET/silver nanowire films and the alignment layers are VA type which is orientation through a rubbing alignment method. The formula of the liquid crystal mixture is shown in TABLE 1. The thickness of the liquid crystal layer is 15 microns. The supporting structures are spherical polystyrene spacers, which account for 0.2% of the total weight of the liquid crystal mixture. By selecting the appropriate driving voltage, the flexible bistable light modulating device was respectively driven to the transparent state or the light scattering state, where the total light transmittance and haze values are measured, as shown in TABLE 13.

TABLE 13 performance data of the light modulating device

| Transparent state | | Light transmittance state | |
|---|---|---|---|
| Total light transmittance/% | Haze/% | Total light transmittance/% | Haze/% |
| 85.53 | 5.97 | 62.53 | 88.39 |

Example 11

In this example, the flexible bistable light modulating devices include two flexible transparent conductive films, two alignment layers, a liquid crystal layer and supporting structures. The flexible transparent conductive films are PET/ITO films and the alignment layers are VA type which is orientation through a rubbing alignment method. The formula of the liquid crystal mixture is shown in TABLE 1. The thickness of the liquid crystal layer is 15 microns. The supporting structures are spherical polystyrene spacers, which account for 0.2% of the total weight of the liquid crystal mixture. By selecting the appropriate driving voltage, the flexible bistable light modulating device was respectively driven to the transparent state or the light scattering state, where the total light transmittance and haze values are measured, as shown in TABLE 14.

TABLE 14

| performance data of the light modulating device | | | |
| --- | --- | --- | --- |
| Transparent state | | Light transmittance state | |
| Total light transmittance/% | Haze/% | Total light transmittance/% | Haze/% |
| 86.20 | 2.66 | 65.40 | 87.53 |

The liquid crystal mixture used in the bistable light modulating device includes bimesogenic compounds, nematic liquid crystal compounds and chiral compounds which are known well by those skilled in the art. The formula 1-3 of the liquid crystal mixture are considered illustrative rather than limiting.

By introducing bimesogenic compounds into the liquid crystal layer, the flexible bistable light modulating device of the present invention can realize zero-electric-field bistable states without the assist of the polymer network, thus saving energy, simplifying the production process, saving cost and improving product yield.

While several particular exemplary embodiments have been described above in detail, the disclosed embodiments are considered illustrative rather than limiting. Those skilled in the art will readily realize that alternatives, modifications, variations, improvements, and substantial equivalents are possible without substantially departing from the novelty spirits or scope of the present disclosure. Thus, all such alternatives, modifications, variations, improvements, and substantial equivalents are intended to be embraced within the scope of the present disclosure as defined by the appended claims.

The invention claimed is:

1. A bistable light modulating device, comprising:
   a first flexible transparent conductive film and a second flexible transparent conductive film;
   a liquid crystal layer disposed between the first flexible transparent conductive film and the second flexible transparent conductive film, wherein the liquid crystal layer comprises a liquid crystal mixture and a sealing structure to seal the liquid crystal mixture within the liquid crystal layer, wherein the liquid crystal mixture includes at least one bimesogenic compound, at least one nematic liquid crystal compound and at least one chiral compound; and
   a plurality of supporting structures distributed inside the liquid crystal layer, wherein the weight percentage of the supporting structures over the liquid crystal mixture is 0.1%-4.5%, and
   wherein, the bistable light modulating device includes two states that are stable when no external electric field is applied: a transparent state where substantially all incident light is transmitted and a light scattering state where substantially all incident light is scattered.

2. The bistable light modulating device as defined in claim 1, wherein the thickness of the liquid crystal layer is 5-60 µm.

3. The bistable light modulating device as defined in claim 1, wherein the first flexible transparent conductive film comprises a first flexible transparent substrate and a first flexible transparent electrode sandwiched between the first flexible transparent substrate and the liquid crystal layer, and the second flexible transparent conductive film includes a second flexible transparent substrate and a second flexible transparent electrode sandwiched between the second flexible transparent substrate and the liquid crystal layer.

4. The bistable light modulating device as defined in claim 3, wherein the materials of the first flexible transparent substrate and the second flexible transparent substrate include PET, PEN, PC, PP, PMMA, PBT, PVC, PI and/or cellulose.

5. The bistable light modulating device as defined in claim 3, wherein the first flexible transparent electrode or the second flexible transparent electrode is a carbon-based conductive film, a metallic nanowire conductive film and/or a metallic oxide conductive film.

6. The bistable light modulating device as defined in claim 1, further comprising at least one alignment layer disposed between the first flexible transparent conductive film and the liquid crystal layer and/or between the second flexible transparent conductive film and the liquid crystal layer.

7. The bistable light modulating device as defined in claim 1, wherein the sealing structure is formed from a sealant and the sealant includes thermo-curable adhesive, photo-curable adhesive and/or UV-thermo-curable adhesive.

8. The bistable light modulating device as defined in claim 1, wherein the material of the supporting structures includes resins, fiber glass and/or inorganic materials.

9. The bistable light modulating device as defined in claim 1, wherein the supporting structures are sphere-shaped, rod-shaped or their combination.

10. The bistable light modulating device as defined in claim 1, wherein the supporting structures have a hard core and a sticky surface, and wherein the supporting structures are immiscible with the surrounding liquid crystal mixture.

11. The bistable light modulating device as defined in claim 1, comprising a plurality of individual bonding structures disposed in the liquid crystal layer, wherein the bonding structures connect to the inner surfaces of the first flexible transparent conductive film and the second flexible transparent conductive film.

12. The bistable light modulating device as defined in claim 11, wherein the bonding structures are arranged in a predetermined pattern, and wherein the predetermined pattern is a two dimensional hexagonal, square or pseudo random pattern.

* * * * *